United States Patent

Richardson

[11] Patent Number: 5,271,219
[45] Date of Patent: Dec. 21, 1993

[54] GAS TURBINE ENGINE COMBUSTOR

[75] Inventor: John S. Richardson, Derby, England

[73] Assignee: Rolls-Royce plc, London, England

[21] Appl. No.: 736,922

[22] Filed: Jul. 29, 1991

[30] Foreign Application Priority Data

Sep. 1, 1990 [GB] United Kingdom ............... 9019097

[51] Int. Cl.⁵ .................................. F02C 3/06
[52] U.S. Cl. .............................. 60/39.36; 60/756; 60/39.11
[58] Field of Search ............... 60/749, 39.11, 39.36, 60/752, 756, 39.32

[56] References Cited

U.S. PATENT DOCUMENTS 4,380,905 4/1983 Smart et al. ................... 60/756
4,934,145 6/1990 Zeisser ............................ 60/756

Primary Examiner—Richard A. Bertsch
Assistant Examiner—W. J. Wicker
Attorney, Agent, or Firm—Oliff & Berridge

[57] ABSTRACT

A gas turbine engine annular combustor (16) has a bulkhead (19) at its upstream end which is protected by an annular array of heatshields (32). Each of the heatshields (32) is spaced apart from the bulkhead (19) by flanges (37, 38,39,40) on the upstream heatshield face. Cooling air entry apertures (47) provided in the bulkhead (19) direct cooling air into the space (36) between the bulkhead (19) and each heatshield (32). The flanges (37,38,39,40) direct the cooling air so that some flows towards a fuel burner aperture (35) in the center of each heatshield (32) while the remainder flows towards the heatshield (32) edges.

7 Claims, 3 Drawing Sheets

GAS TURBINE ENGINE COMBUSTOR

This invention relates to a gas turbine engine combustor and is particularly concerned with the thermal protection of the wall or bulkhead at the upstream end of an annular combustor.

Modern gas turbine engines are commonly provided with a combustor which is of generally annular configuration. Usually a wall or bulkhead is provided at the upstream end of the combustor which is suitably apertured to receive a number of fuel burners. The fuel burners are equally spaced around the combustor and direct fuel into the combustor to support combustion therein. The combustor bulkhead is therefore usually close to the high temperature combustion process taking place within the combustor, making it vulnerable to heat damage.

One way of protecting the bulkhead from the direct effects of the combustion process is to position heat shields on its vulnerable parts. Typically each heat shield is associated with a corresponding fuel burner, and extends both radially towards the radially inner and outer extents of the bulkhead and circumferentially to abut adjacent heat shields. Each heat shield is spaced apart from the bulkhead so that a narrow space is defined between them. Cooling air is directed into this space in order to provide cooling of the heat shield and so maintain the heat shield and the bulkhead at acceptably low temperatures.

In practice it has been found that certain parts of the heat shields have been difficult to cool effectively so that localised overheating occurs.

It is an object of the present invention to provide a gas turbine annular combustor in which more effective cooling of the heatshields is achieved.

According to the present invention, a gas turbine engine annular combustor includes a bulkhead at its upstream end, said bulkhead having a plurality of apertures therein, each aperture being adapted to receive a fuel burner, and a plurality of heatshields located on the downstream face of said bulkhead so as to provide thermal shielding thereof, each of said heatshields being associated with a corresponding one of said fuel burner apertures and itself having a corresponding fuel burner aperture therein, means being provided to space apart each of said heatshields and said bulkhead so that corresponding chambers are defined therebetween, said bulkhead having a plurality of further apertures therein to direct cooling air into each of said chambers, means being provided to subdivide each of said chambers so that a portion of the air operationally delivered to each chamber through said further apertures is directed to flow generally towards said fuel burner aperture of that chamber to be exhausted from said chamber adjacent said fuel burner aperture while the remainder of said cooling air operationally delivered to each chamber through said further apertures is directed away from said fuel burner aperture towards said heatshield edges to be exhausted from said chamber adjacent said edges.

The invention will now be described, by way of example, with reference to the accompanying drawings in which FIG. 1 is a side view of a ducted fan gas turbine engine having a combustor in accordance with the present invention.

Figure 1:
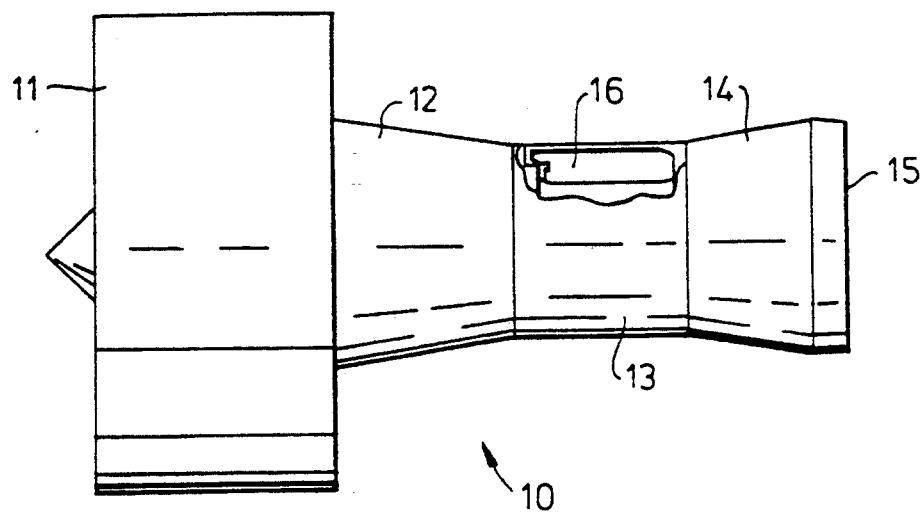

Referring to FIG. 1, a ducted fan gas turbine engine generally indicated at 10 is of conventional construction in that it comprises, in axial flow series, a ducted fan 11, compressors 12, combustion equipment 13, turbines 14, and a propulsion nozzle 15. The engine operates in the conventional way so that air compressed by the fan 11 and compressors 12 is mixed with fuel and the mixture combusted in the combustion equipment 13. The resultant combustion products then expand through the turbines 14, which drive the fan 11 and compressors 12, to be exhausted through the propulsion nozzle 15. Propulsive thrust is provided both by the propulsion nozzle 15 exhaust and by part of the air flow exhausted from the fan 11.

Figure 2:
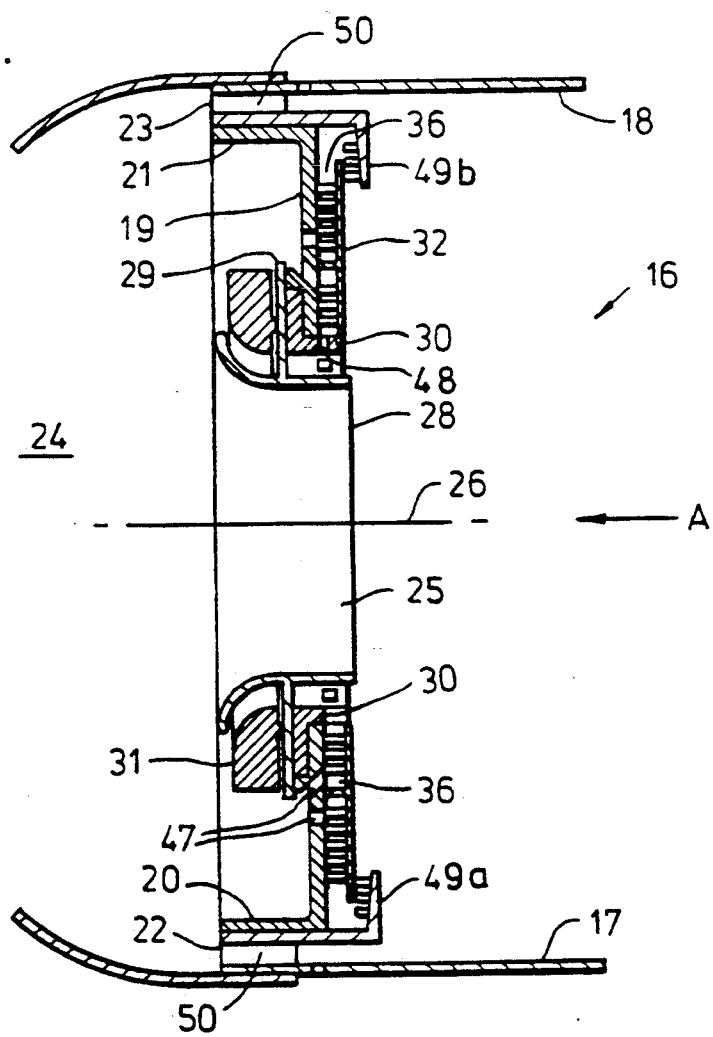
FIG. 2 is a sectioned side view of a portion of the upstream end of a combustor in accordance with the present invention, the fuel burners of the combustion having been omitted in the interests of clarity.

The combustion equipment 13 comprises an annular combustor 16, the upstream end of a portion of which can be seen more clearly if reference is now made to FIG. 2. The combustor 16 comprises radially inner and outer walls 17 and 18 respectively which are interconnected at their upstream ends by an annular bulkhead 19, the majority of which is generally planar and radially extending. The radially inner and outer extents 20 and 21 respectively of the bulkhead 19 are flanged so as to facilitate their attachment to the combustor walls 17 and 18 via radially inner and outer rings 22 and 23 respectively. The combustor walls 17 and 18 extend upstream of the bulkhead to define a region 24 which is fed with air from the compressors 12.

Figure 3:
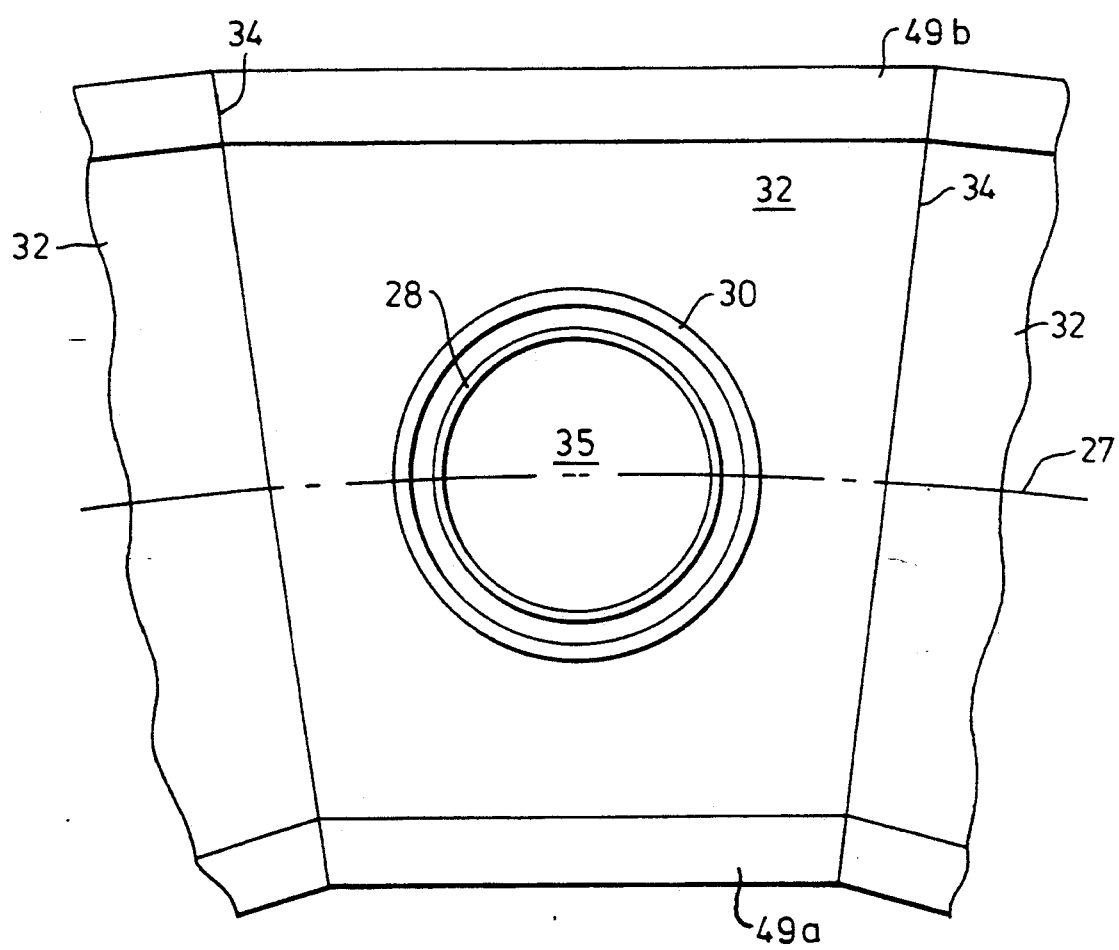
FIG. 3 is a view on arrow A of FIG. 2.

A plurality of apertures 25 are provided in the bulkhead 19, each one to receive the outlet end of a fuel burner (not shown). The apertures 25 are equally spaced around the bulkhead 19 so that their longitudinal axes 26 constitute generators of a notional cylindrical surface 27 which can be seen in FIG. 3. The axis of the notional cylindrical surface 27 is coaxial with the longitudinal axis of the engine 10.

Referring to FIG. 2, an annular seal 28 is located in each bulkhead aperture 25 to receive the fuel burner outlet end referred to earlier. Each annular seal 28 is provided with a flange 29 which is interposed between an L-shaped cross-section ring 30 located in the aperture 25 and a further ring 31. The L-shaped ring 30 and the further ring 31 are interconnected (by means not shown) to support the annular seal 28 preventing axial movement thereof but permitting a limited degree of radial movement. This is so as to take account of the inevitable problems arising from the thermal mis-matching of the fuel burners and the remainder of the combustor 16.

The bulkhead 19 is particularly vulnerable to overheating as a result of the combustion process which takes place within the combustor. In order to provide thermal shielding of the bulkhead 19, a plurality of heat shields 32 are attached to it. Each heatshield 32 is provided with four integral bolts 33 (FIG. 4) which facilitate its attachment to the bulkhead 19.

Each heatshield 32 is of generally trapezoidal configuration having radially extending edges 34 which abut the corresponding edges of adjacent heatshields 32. The heatshields 32 therefore cooperate to define a fully annular shield.

Each heatshield 32 is associated with a corresponding bulkhead fuel burner aperture 25 and is itself provided with a corresponding fuel burner aperture 35. As can be seen in FIG. 2, the bulkhead 19 and heatshield 32, apertures 25 and 35 respectively are coaxially aligned to accommodate the seals 28 in radially spaced apart relationship therewith and hence the fuel burners.

The heatshields 32 are all of similar construction. Consequently they will described with reference to a single heatshield 32.

The upstream face of the heatshield 32 is spaced apart from the downstream face of the bulkhead 19 so that a chamber 36 is defined between them. The spacing apart of the bulkhead 19 and the heatshield 32 is provided by a number of flanges which are provided on the upstream face of the heatshield 32. It will be appreciated, however, that some or all of the flanges could alternatively be formed on the downstream face of the bulkhead 19 if so desired.

Figure 4:
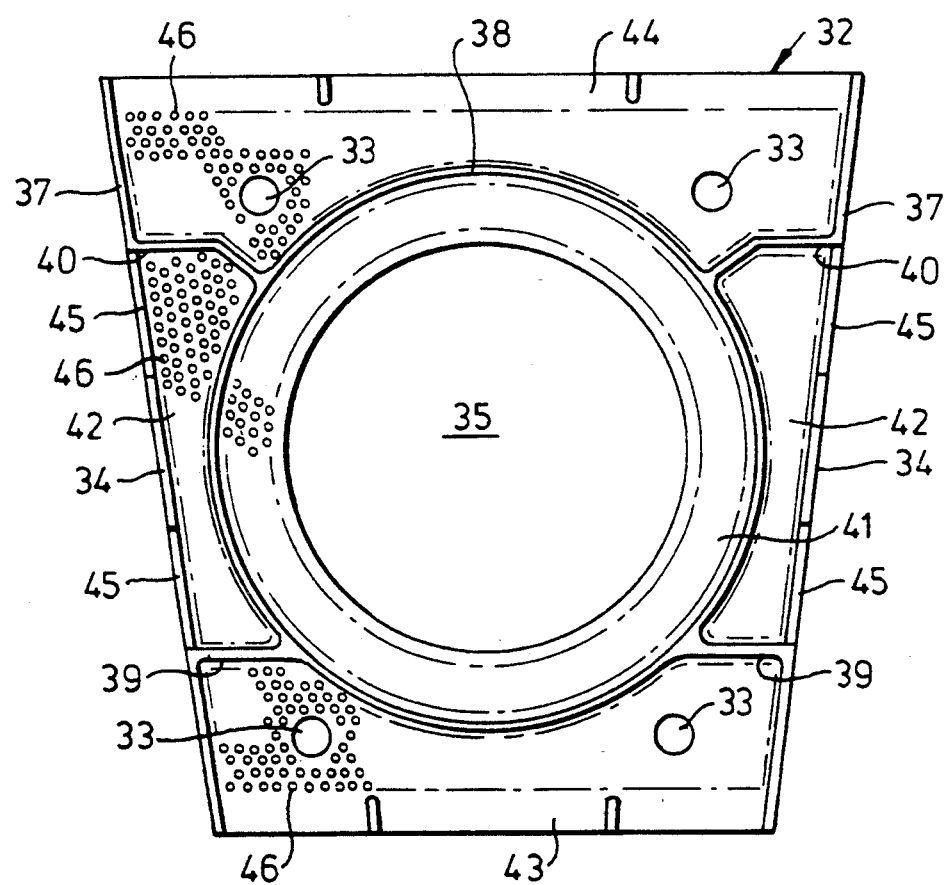
FIG. 4 is a view in the axially upstream direction of a heatshield of a combustor in accordance with the present invention.

Specifically, referring to FIG. 4, the heatshield 32 is provided with straight flanges 37 which are located along the full radial extent of each of the heatshield edges 34, an annular flange 38 which is coaxial with, but radially spaced apart from the heat shield burner aperture 35, two short flanges 39 which interconnect the annular flange 38 at its radially inner region with the edge flanges 37 and two cranked flanges 40 which interconnect the annular flange 38 at its radially outer region with the edge flanges 37.

The flanges 37,38,39 and 40 subdivide the chamber 36 into a number of compartments. Thus an annular compartment 41 is defined between the annular flange 38 and the aperture 35, side compartments 42 are defined between the annular flange 38 and the side flanges 37, and radially inner and outer compartments 43 and 44 are defined between the annular flange 38 and the radially inner and outer heatshield 32 edges respectively.

Gaps 45 are provided in the side flanges 37. In addition, pedestals 46 are formed on the upstream surface of the heatshield 32 in order to provide an enhanced heat exchange relationship between the heatshield 32 and air flowing through the compartments 41,42,43 and 44. Some of the pedestals 46 have been omitted in the interests of clarity.

The axial portion of the L-shaped cross-section ring 30 locates within the burner aperture 35 of the heatshield 32 so as to define a radially inner boundary to the annular compartment 41.

The bulkhead 19 is provided with a plurality of small apertures 47 which interconnect the region 24 with the interiors of the compartments 41,42,43 and 44. The small apertures 47 serve to provide a flow of cooling air from the region 24 into the compartments 42,43 and 44.

Specifically there is an annular array of small apertures 47 which direct cooling air into the annular compartment adjacent the annular flange 38. That cooling then flows in a generally radially inward direction towards the fuel burner axis 26 thereby providing localised cooling of the heatshield 32. A plurality of apertures 48 in the L-shaped cross-section ring 30 permit the exit of cooling from the annular compartment 41 to provide impingement cooling of the annular seal 28.

Similarly a further annular array of small apertures 47 is provided, some of which direct cooling air into the side compartments 42 adjacent the annular flange. However the cooling air flows in generally circumferential directions towards the heat shield edges 34, again providing localised cooling of the heat shield 32. The cooling air is then exhausted from the side compartments through the flange gaps 45 to escape between adjacent heatshields 32.

Finally the remainder of the further annular array of small apertures 47 direct cooling air into the radially inner and outer compartments 43 and 44 adjacent the annular flange 38. That cooling air then flows away from the nominal surface 27 and towards the radially inner and outer edges of the heatshield 32 to be exhausted at those radially inner and outer edges, again providing localised heatshield 32 cooling as it does so.

In order to make further use of the cooling air exhausted from the radially inner and outer edges of the heatshield 32, the downstream ends of the radially inner and outer bulkhead support rings 22 and 23 are axially extended so as to define L-shaped air flow deflectors 49a and 49b respectively. Thus the radially inner air flow deflector 49a cooperates with the radially inner edge of the heat shield 32 to define a structure which reverses the direction of the air flow from the radially inner heatshield edge. The cooling air then flows across the radially inner part of the downstream face of the heatshield 32 towards the nominal surface 27, thereby providing film cooling of that downstream face part.

Similarly the radially outer air flow deflector 49b cooperates with the radially outer heatshield 32 edge to define a structure which directs cooling air across the radially outer part of the downstream face of the heatshield 32 towards the nominal surface 27. Film cooling of that part of the heatshield is therefore also provided.

Apertures 50 in the radially inner and outer bulkhead support rings 22 and 23 permit further flows of cooling air from the region 24 into the combustor 16 adjacent its radially inner and outer walls 17 and 18 respectively.

It will be seen therefore that the heatshields 32 are provided with a high level of cooling over the majority of their surfaces, thereby enabling them to provide effective thermal protection of the bulkhead 19.

I claim:

1. A gas turbine engine annular combustor including a bulkhead at its upstream end, said bulkhead having a plurality of fuel burner apertures therein, each aperture being adapted to receive a fuel burner, and a plurality of heatshields located on the downstream face of said bulkhead so as to provide thermal shielding thereof, each of said heatshields having edges and being associated with a corresponding one of said fuel burner apertures and itself having a corresponding fuel burner aperture therein, means being provided to space apart each of said heatshields and said bulkhead so that corresponding chambers are defined therebetween, said bulkhead having a plurality of further apertures therein to direct cooling air into each of said chambers, means being provided to subdivide each of said chambers so that a portion of the air operationally delivered to each chamber through said further apertures is directed to flow generally towards said fuel burner aperture of that chamber to be exhausted from said chamber adjacent that fuel burner aperture while the remainder of said cooling air delivered to each chamber through said further apertures is directed away from said fuel burner aperture towards said heatshield edges to be exhausted from said chamber adjacent said edges, means provided adjacent the radially inner and outer edges of each of said heatshields to deflect at least some of the cooling air exhausted from said chamber adjacent said radially inner and outer edges across the downstream face of said heatshield to provide film cooling thereof, seal means located in said corresponding burner apertures in said bulkhead and heatshields to receive fuel burners, means being provided to direct some of the cooling air exhausted from said chambers to provide cooling of said seal means, wherein said means to space apart each of said heatshields and said bulkhead comprises flanges provided on said heatshields, said flanges being connected to said bulkhead, at least some of said flanges constitute said means provided to subdivide each of said chambers, and each of said chambers is sub-divided by an annular flange which is spaced apart from and coaxial with the fuel burner aperture associated with the chamber.

2. A gas turbine engine combustor as claimed in claim 1 wherein further flanges extend between said annular flange and the side edges of each of said heatshields so as to ensure that said remainder of said cooling air operationally delivered to each chamber through said further apertures is directed away from said fuel burner apertures and towards said heatshield edges.

3. A gas turbine engine combustion as claimed in claim 1 wherein each of said heatshields is of generally trapezoidal configuration and abuts circumferentially adjacent heat shields.

4. A gas turbine engine combustor as claimed in claim 1 wherein a portion of said plurality of further apertures is disposed in said bulkhead in a radially inward direction extending toward said fuel burner aperture and a remaining portion of said further apertures are disposed in said bulkhead extending in a direction parallel to a longitudinal axis of said fuel burner aperture.

5. A gas turbine engine combustor as claimed in claim 1, further comprising a plurality of apertures located adjacent said fuel burner aperture in the space between said head shields and said bulkhead to allow exhaustion of cooling air adjacent said fuel burner aperture.

6. A gas turbine engine combustor as claimed in claim 1 wherein the upstream surface of each of said heatshields includes means to enhance the heat exchange relationship between said heatshields and cooling air operationally flowing through said chambers.

7. A gas turbine engine combustor as claimed in claim 6 wherein said means to enhance the heat exchange relationship comprise integral pedestals on each of said upstream surfaces.

* * * * *